(12) United States Patent
Burns et al.

(10) Patent No.: US 7,599,930 B1
(45) Date of Patent: Oct. 6, 2009

(54) CONCEPT SYNONYM MATCHING ENGINE

(75) Inventors: Derrick Burns, San Mateo, CA (US);
Earl Rennison, Mountain View, CA (US)

(73) Assignee: Trovix, Inc., Mountain View, CA (US)

( * ) Notice: Subject to any disclaimer, the term of this patent is extended or adjusted under 35 U.S.C. 154(b) by 239 days.

(21) Appl. No.: 11/253,974

(22) Filed: Oct. 18, 2005
(Under 37 CFR 1.47)

Related U.S. Application Data

(60) Provisional application No. 60/620,626, filed on Oct. 19, 2004.

(51) Int. Cl.
*G06F 7/00* (2006.01)
*G06F 17/30* (2006.01)
*G06F 17/00* (2006.01)

(52) U.S. Cl. ............................. 707/6; 707/9; 707/102
(58) Field of Classification Search ................. 707/102, 707/9, 6
See application file for complete search history.

(56) References Cited

U.S. PATENT DOCUMENTS

| | | | | |
|---|---|---|---|---|
| 6,539,373 | B1* | 3/2003 | Guha | 707/3 |
| 6,976,019 | B2* | 12/2005 | Davallou | 707/6 |
| 2003/0220909 | A1* | 11/2003 | Farrett | 707/3 |
| 2004/0054679 | A1* | 3/2004 | Ralston | 707/100 |

OTHER PUBLICATIONS

Xiaogang Peng and Ben Choi, Automatic web page classification in a dynamic and hierarchical way, 2002, pp. 386-393, (http://ieeexplore.ieee.org/iel5/8435/26564/01183930.pdf).*

"Automatic Classification," Autonomy [online] [Retrieved on Feb. 1, 2006] Retrieved from the Internet<URL: http://www.autonomy.com/content/Products/IDOL/f/Classification.html>, 7 pages.

"Autonomy Technology White Paper," Autonomy [online] Copyright 2003, Retrieved from the Internet: <URL: http://www.autonomy.com>, 19 pages.

Hillyer, Mike, "MySQL AB: An Introduction to Database Normalization" [online] [Retrieved on Feb. 1, 2006] Retrieved from the Internet: <URL: http://dev.mysql.com/tech-resources/articles/intro-to-normalization.html>, 6 pages.

"Stratify Classification Server," Stratify, Inc., [online] Copyright 2003, Retrieved from the Internet: <URL:http://www.stratify.com>, 4 pages.

* cited by examiner

*Primary Examiner*—Shahid A Alam
*Assistant Examiner*—Alexey Shmatov
(74) *Attorney, Agent, or Firm*—Fenwick & West LLP

(57) ABSTRACT

A concept synonym matching engine identifies and extracts specific information referenced in a selection of text and matches the information to a set of defined concepts. The engine is able to perform this identification and matching in the presence of errors (e.g., misspellings, etc.) or variations in the description of those concepts (e.g., use of different terms to define the same idea). The engine performs these functions by tokenizing an input string of text and matching these tokens to tokens of a pattern that represents a concept to be matched. The engine matches the pattern to a sub-string of text, scores the match, and uses the score to determine whether the concept is present in the input string or to select the optimal match.

50 Claims, 8 Drawing Sheets

| Concept | Pattern | Tokenization |
|---|---|---|
| Stanford Leland Jr. University | "Stanford University" | \<Stanford\> \<University\> |
| Princeton University | "Princeton University" | \<Princeton\> \<University\> |
| Harvard University | "Harvard" | \<Harvard\> |

FIG. 4

CONCEPT SYNONYM MATCHING ENGINE

RELATED APPLICATIONS

This application claims the benefit of U.S. Provisional Application No. 60/620,626 filed on Oct. 19, 2004, entitled "Concept Synonym Matching Engine," the entire disclosure of which is hereby incorporated by reference herein in its entirety for all purposes.

BACKGROUND OF THE INVENTION

1. Field of the Invention

This invention pertains in general to systems and methods for identifying specific information referenced in a selection of text, and more specifically to a concept synonym matching engine for identifying and extracting concepts referenced in a selection of text and matching these to defined concepts in the presence of errors or variations in the description of those concepts.

2. Description of the Related Art

Identifying concepts described in text is fundamental to the problem of building intelligent conceptual searching engines. A common problem in concept identification or matching systems is the difficulty of correctly identifying a concept cited in a selection of text and matching the concept to a separate set of defined concepts, especially where the selection of text is likely to include some variations or errors. For example, one of the most difficult and time consuming tasks in corporate staffing is the screening of hundreds or thousands of resumes to find the right candidate for a particular job. With the numerous job search websites available today, companies now have access to a very large resumé base, and thus a large set of potential candidates to fill their job openings. However, actually identifying the resumés of the most qualified candidates within a very large database by searching for key terms within the resumés can be a great challenge. An employer ideally would like to define a set of concepts of interest or desired features in job description (e.g., a particular university, grade point average over a certain number, worked at particular companies, particular types of job experience or abilities, and the like), and then automatically and in real time identify and match those concepts to the resumés. However, if the system is not effective at matching concepts, the employer may risk missing a number of potentially good candidates, and thus risk project delays and missed deals in the meantime while candidate search progresses. Employers may also receive numerous poor matches for the job description through which the employer must spend time and money sifting to find the few good candidates buried within the pile of resumés.

This problem can be accentuated when the selections of text through which a matching system searches can originate from a number of sources and the text is unstructured, making it more difficult to search for selections of text within these various documents. For example, in a job search, an employer may receive resumés from numerous different sources, in many different formats, using different types of fonts, with different textual arrangements on a page, and the like. An employer may receive resumes as hard copies, by e-mail, through job search websites (e.g., that may be formatted according to the job search website's requirements), through the enterprise's own job search system (e.g., that may be formatted according to the enterprise's own requirements), and the like. Matching systems may not be able to identify specific concepts amongst the unstructured text or the various document formats.

Additionally, the identification and matching must commonly be performed in the presence of errors or variations in the description of those concepts. If the system is unable to recognize misspelled words or cannot equate the different terms and abbreviations that may be used to describe one concept (e.g., "University of California, Berkeley" or "UC Berkeley" in a resumé), the system may again miss numerous proper matches.

Classification technologies used currently to do some types of matching are able to do broad generalizations and high-level matching of concepts in a selection of text. However, these technologies tend to fail when required to search through very short sentences or strings of text. These classification technologies often have trouble doing a matching when the matching involves only a few very specific words in a selection of text. Natural language processing technologies are also commonly used in the concept matching context. However, these technologies commonly require some sort of structure in the text (e.g., noun phrases and verb phrases in a subject, action, object sentence structure or other typical types of structures for text). The natural language processing technologies require this structure to be able to figure out the parts of speech in text and to extract concepts. Thus, these technologies are unable to reliably extract concepts in a series of words or a string of text that is unstructured, such as might be used in a resumé as a set of words separated by commas to define a list of skills of the job candidate. In addition, while these natural language technologies may be able identify some terms within a selection of text, they are typically not meant to match the text or its terms against a taxonomy or a previously-defined concept (e.g., matching skills in a resumé against a pre-defined collection of skill concepts)

SUMMARY OF INVENTION

A concept synonym matching engine identifies concepts referenced in an input string of text. In one embodiment, the concept synonym matching engine includes a tokenization module that divides the input string into one or more input tokens that form one or more sub-strings of text within the input string. A representation module represents the concept to be identified with a pattern that is divided into one or more pattern tokens. Applying the input and pattern tokens, the token matching module identifies a token match between the one or more input tokens and the one or more pattern tokens. A pattern matching module identifies a pattern match between one of the one or more sub-strings and the pattern based on the token match. Once the matches are identified, a pattern scoring module scores the pattern match based on the token match. A pattern selection module determines whether the concept is present in the input string based on the score. Additionally, which one of the one or more sub-strings of text in the input string naming the concept is identified based on the token match.

In another embodiment, the concept synonym matching engine performs a method that includes dividing the input string into one or more input tokens that represent one or more sub-strings of text within the input string. A concept is represented by a pattern that is divided into one or more pattern tokens, and the pattern is made up of one or more basic patterns. The engine identifies a token match between the one or more input tokens and one or more pattern tokens. The engine also identifies a pattern match between one of the one or more sub-strings and the pattern based on the token match. Once these matches are identified, the engine scores the pattern match based on the token match by assigning each of the one or more basic patterns a weight that together equal the total weight for the pattern. The engine selects the pattern match with the total weight that is highest and where the pattern match does not overlap any other pattern matches for the input string.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is a table illustrating one example of representing concepts with one or more patterns that can then be decomposed into tokens, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The concept synonym matching engine described herein effectively identifies and extracts specific information referenced in a selection of text, and matches the information to defined concepts. In addition, this identification and matching is performed in the presence of errors and misspellings in the input text or variations in the input text (e.g., use of different words to describe the same entity, variations in writing style and font, variations in placement of text on a page, and the like).

As used herein, the term "concept" includes any type of information or representation of an idea, topic, category, classification, group, term, unit of meaning and so forth, expressed in any symbolic, graphical, textual, or other forms. For example, concepts typically included in a resumé include university names, companies, terms identifying time (e.g., years), experiences, persons, places, locations, names, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like.

While the concept synonym matching engine described herein is commonly described in relation to a resumé analysis application, and the examples provided are those involving searching for concepts in a resumé, the engine can also be used for identifying concepts in other applications. For example, the engine can be used in a word/phrase search or comparison search through documents, articles, stories, publications, books, presentations, etc., in a search for court cases, medical cases, etc., in a search for television programs, radio programs, etc., and many other types of searches. Thus, the examples described here are to be considered illustrative but not limiting of the scope of the invention or implying necessary or essential features or characteristics.

Figure 1A:
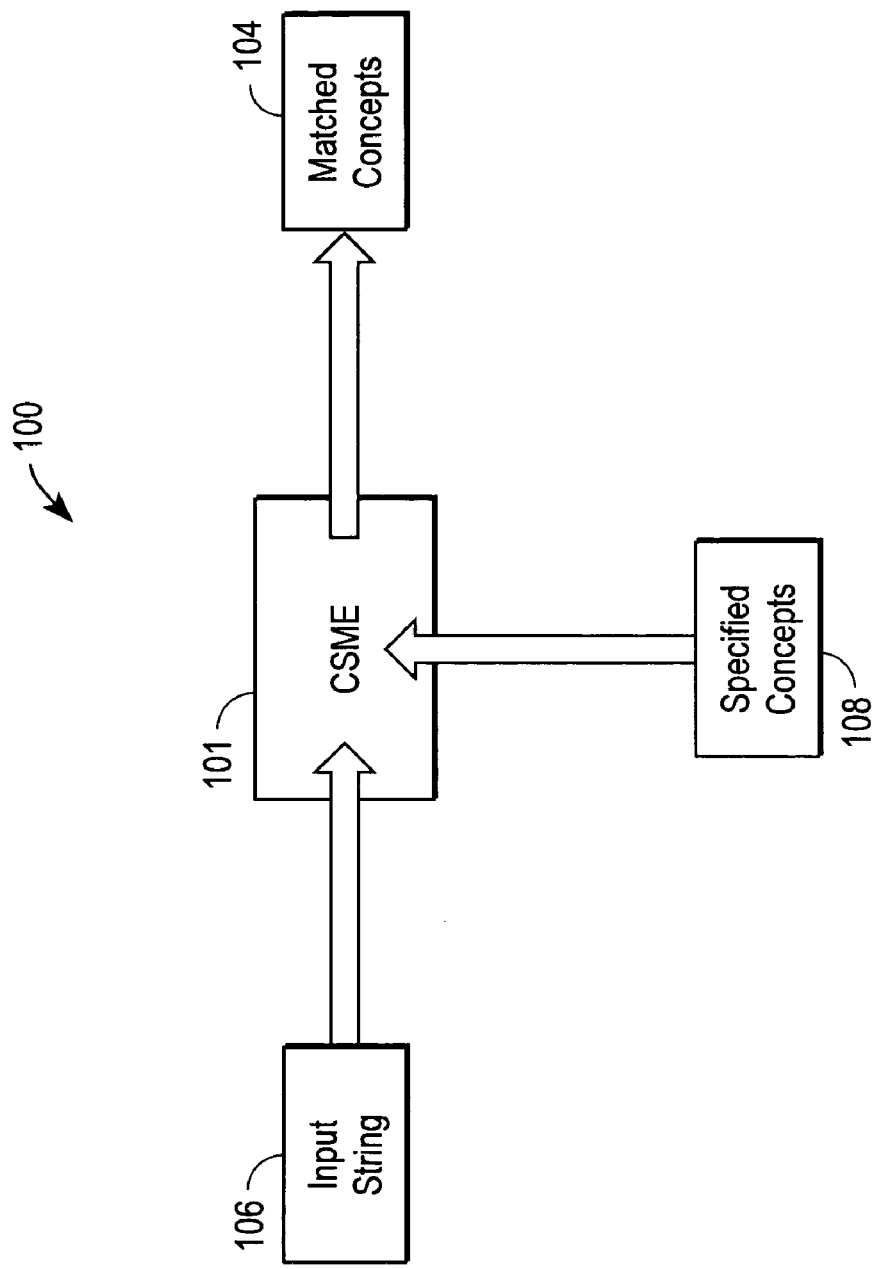
FIG. 1a is a high-level block diagram illustrating the system 100 for identifying concepts referenced in a selection of text, according to one embodiment of the present invention.

Referring to FIG. 1a, there is shown a high-level block diagram of the system 100 for identifying concepts referenced in a selection of text, according to an embodiment of the system 100. In this embodiment, the concept synonym matching engine (CSME) 101 reviews an input string 106 of text from a source (e.g., from a resumé provided by a job applicant, from a literature reference, from a website, or any other collection of information). The input string 106 can be composed of letters, numbers, punctuation, words, collections of words or a phrases, sentences, paragraphs, symbols or other characters, any combination of these, etc. The CSME 101 also receives the specified concepts 108 to be identified, including concepts which the CSME 101 is to identify in the input string 106. The set of specified concepts 108 can include any information that is being searched for within the input string 106, such as university attended, degrees attained, skills, companies worked at, titles held, etc., information in a publication, on a website, and the like. The CSME 101 tries to identify matches between the specified concepts 108 to be identified and the input string 106, and translates those matches to one or more matched concepts 104. The matched concepts 104 are concepts that the CSME 101 has identified to be present within the input string 106 (e.g., the CSME 101 has found a match between the specified concepts 108 and the text in the input string 106).

As stated above, a common problem in concept matching systems is to identify a particular concept cited in a selection of text. There can be at least two variants of this problem. In one variant, the selection of text is short (e.g., citing at most one entity or concept from a known domain of concepts), such as a search input string entered by a user, or a field in a database. As explained above, classification technologies commonly have difficulty performing matchings on short selections of text. In this variant, the CSME 101 can determine if the text identifies a known concept and, if so, the CSME 101 can identify that concept. In another variant, the selection of text is long (e.g., identifying more than one concept from one or more known domains of concepts). In this variant, the CSME 101 can identify the set of concepts contained in the text, and the CSME 101 can identify for each concept the sub-string of the text that corresponds to the concept such that no two sub-selections share the same word in the same location of the text. A correspondence between a concept or a pattern and a sub-string or sub-sequence of text or between two tokens is referred to herein as a matching or a match.

Figure 1B:
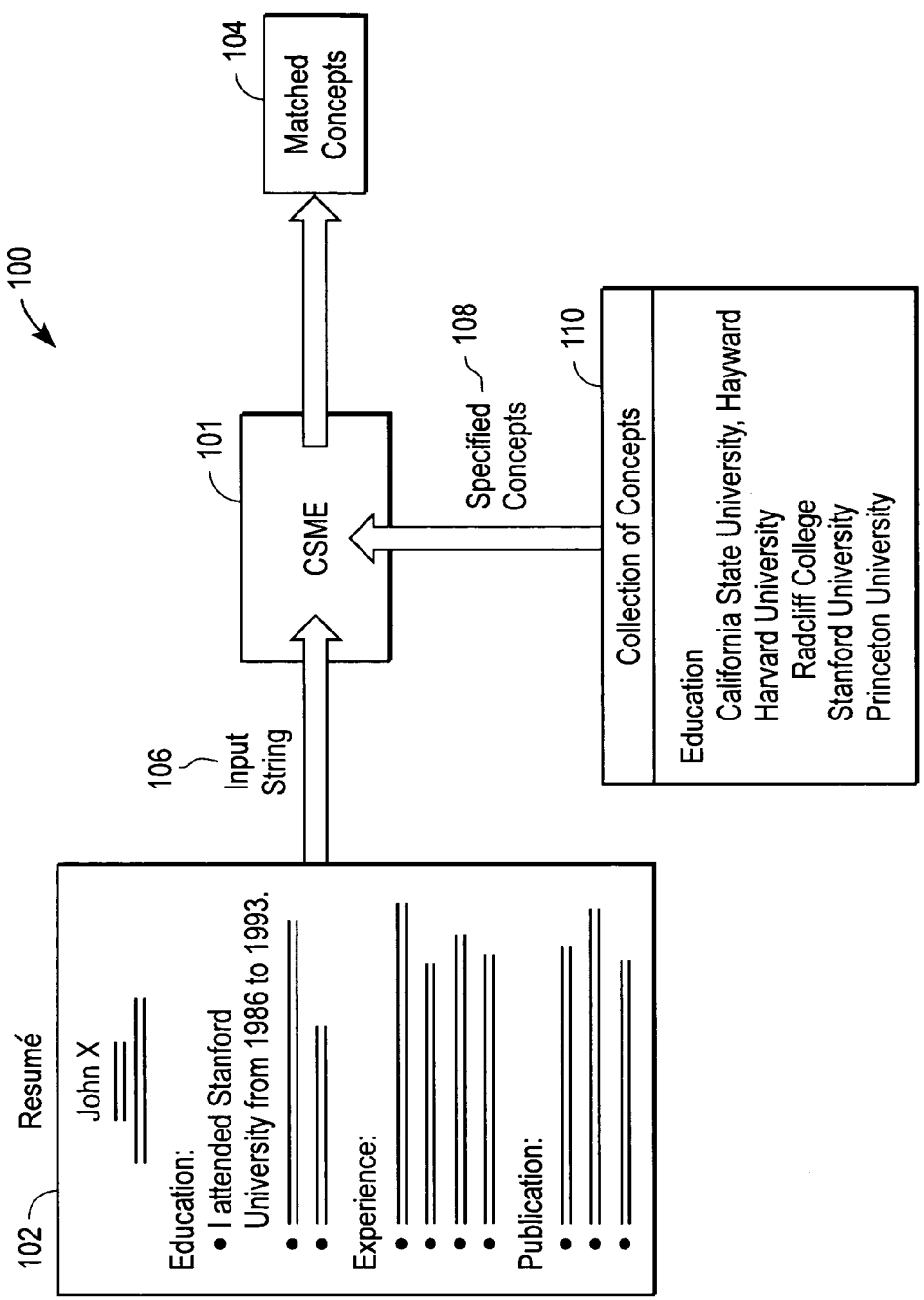
FIG. 1b is a high-level block diagram illustrating one example of the usage of the concept synonym matching engine 101 in a job search scenario, according to one embodiment of the present invention.
Figure 3:
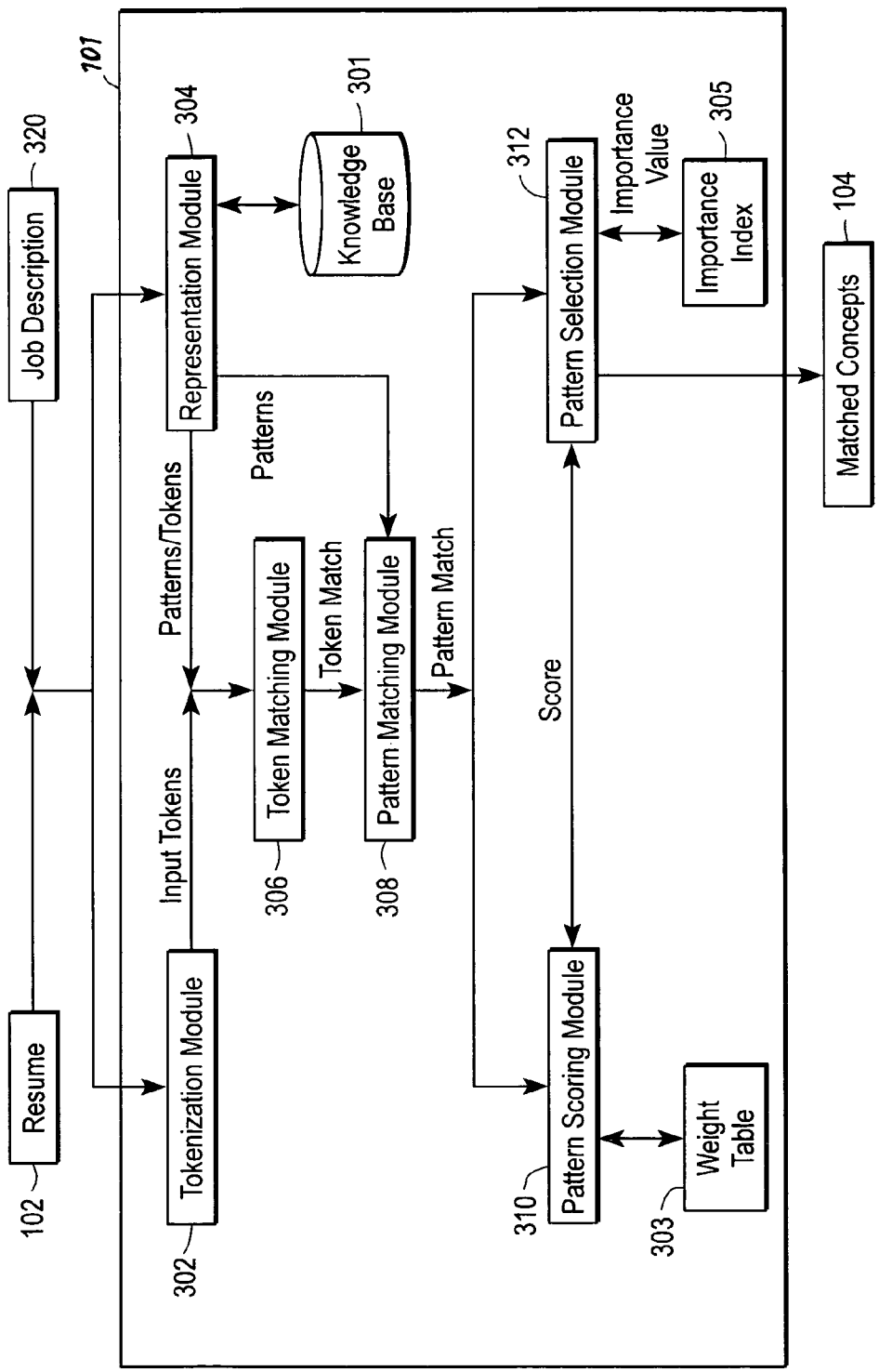
FIG. 3 is a high-level block diagram illustrating the functional modules within the concept synonym matching engine 101, according to one embodiment of the present invention.

FIG. 1b is a high-level block diagram illustrating one example of the usage of the CSME 101 in a job search application, according to an embodiment of the system 100. Here, the CSME 101 is used to identify concepts referenced in selections of text in resumes 102 which serves as a source text. The CSME 101 reviews an input string 106 of text (e.g., "I attended Stanford University from 1986 to 1993") from the resume 102 document for job candidate "John X." In this example, the CSME 101 uses a collection of concepts 110 or a collection or list of terms, either of which serve as the specified concepts 108 to be searched in the candidate's resumé 102. For example, the collection of concepts 110 may include a collection of universities (e.g., Stanford University, Harvard, etc.), a collection of skills (e.g. Java), a collection of companies (e.g., Microsoft), and the like. Thus, the CSME 11 would search in the resumés for each of these specified concepts 108 and try to identify the concepts named or referenced in the resumé 102 (e.g., matched concepts). Subsequently, these matched concepts 104 can be used to determine if a candidate, as represented by his/her resumé 102, is a good match for a job position. As another example, an input string 106 from a job description (e.g., describing desired features in a candidate for a particular position of employment in a company) can be input into the CSME 101 along with the resumé 102, and the CSME 101 can match concepts found in both input strings 106 (e.g., see FIG. 3). In some embodiments, the collection of concepts 110 is stored in a knowledge base, and, in some embodiments, this knowledge base is included within the CSME 101, as illustrated in FIG. 3.

In one embodiment, the operation of the concept synonym matching engine is decomposed into numerous phases, and is discussed according to these phases, including the following:

Lexical Analysis/Tokenization: breaking up the input string into tokens.

Token Matching: determining which tokens in the input string match which tokens in a pattern (and how well they match).

Pattern Matching: selecting which patterns match which sub-sequences or sub-strings of the input string.

Pattern Scoring: evaluating how closely a sub-string of the input string matches a pattern.

Pattern Selection: selecting which patterns are contained in the input string.

Figure 2:
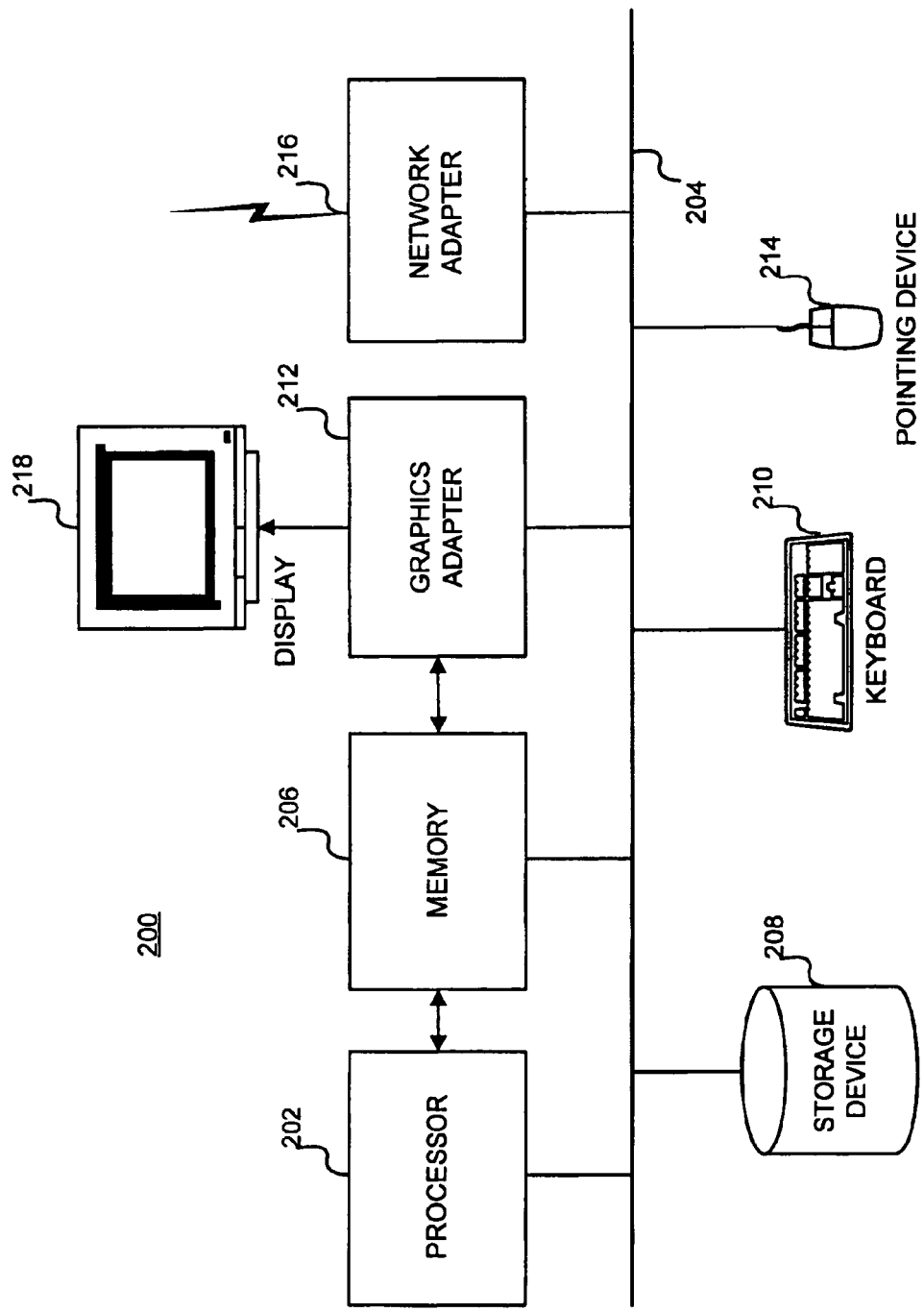
FIG. 2 is a high-level block diagram illustrating a standard computer system 200 for use with the present invention.

FIG. 2 is a high-level block diagram illustrating a functional view of a typical computer system 200 for storing and executing the CSME 101, according to an embodiment of the present invention. One or more of the components of the computer system 200 may be missing or modified when used with system 100. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200. Similarly, a computer program product comprising a computer-readable medium storing computer program instructions for performing functionalities described here is contemplated. A computer-readable medium is known by those of ordinary skill in the art to be a medium on which computer instructions or program code readable by a computer can be stored, such as those examples described above including a CD-ROM, a tape, a DVD, memory, flash memory, etc.

FIG. 3 is a high-level block diagram illustrating the functional modules within the CSME 101, according to an embodiment of the system 100. The CSME 101, in the embodiment illustrated in FIG. 3, includes a tokenization module 302, a representation module 304, a token matching module 306, a pattern matching module 308, a pattern scoring module 310, and a pattern selection module 312. Those of skill in the art will recognize that other embodiments can have different and/or additional modules than those shown in FIG. 3 and the other figures. Likewise, the functionalities can be distributed among the modules in a manner different than described herein.

Lexical Analysis/Tokenization

The tokenization module 302 divides the input string into one or more input tokens that represent one or more sub-strings of text within the input string. In identifying concepts located in the input string of text, the module 302 decomposes the text into individual tokens, which are components of the input string that together identify a lexical construct. Examples of tokens are words, integers, real numbers, symbols, punctuation marks, numbers, email addresses, web addresses, etc. The sub-string of the input string of text can be composed of one token or can be composed of more than one token.

The process of lexical analysis or tokenization (e.g., dividing text into tokens) is preferably conducted by a standard lexical analyzer. Lexical analyzers are often hand written, but can be automatically generated from a description of the lexical constructs. For example, the Java programming language runtime environment has direct support for a rudimentary form of lexical analysis (e.g., JLex).

In some embodiments, the CSME 101 uses lexical constructs, including words, symbols, integers, and real numbers, to represent concepts lexical constructs. These lexical constructs are useful in the job search scenario for identifying of skills, schools, product names, companies, job titles, and the like within resumés for job candidates. As used herein, the term "word" can include any sequence of alphabetic characters, the term "integer" can include any sequence of numbers, the term "real number" can include any sequence or numbers followed by or embedding a period, and the term "symbol" can include any other character in the character set (e.g., the Unicode character set can be used, which provides encodings for practically all written language). To analyze an input string, the CSME 101 can employ any type of lexical analyzer generator (e.g., JLex, JFlex, Flex, Lex, etc.).

As one example of the tokenization performed by the tokenization module 302, consider an input string, such as one that might be found in a resumé 102 for a job candidate or in a job description 320. For example, the input string might identify the school attended by the job candidate, such as an input string that states that "I attended Stanford University from 1986 to 1993." The module 302 can decompose this input string into tokens as follows:

<I> <attended> <Stanford> <University> <from> <1986> <to > <1993>

Thus, the string is broken down into eight separate tokens. A sub-string of this input string could be "Stanford University," which can be decomposed into tokens as follows:

<Stanford> <University>

Thus, the sub-string of text within the input string is broken down into two separate tokens that can then be used in identifying specific concepts within the input string.

The representation module 304 represents the concept to be identified with a pattern that is divided into one or more pattern tokens. A user can choose certain concepts that the user wishes to have the CSME 101 identify in a document. For example, a user can specify a collection of concepts that include schools, and degrees, or only schools. The CSME 101 can then be used to identify these concepts within resumés for job candidates, or other text input strings. In some embodiments, the CSME 101 can also normalize the input string (possibly before tokenization) by mapping characters in the string from one character set into characters in another character set (e.g. mapping diacritic forms into non-diacritic forms such as mapping "cafe" into "cafe," mapping for variations in case, such as lower case or upper case characters, eliminating certain characters, such as punctuation, etc.).

FIG. 4 is a table illustrating one example of representing concepts with one or more patterns that can then be decomposed into tokens, according to an embodiment of the invention. FIG. 4 identifies a number of concepts, and specifically the concepts included in this example are universities that might be identified by a user as desired features in a job candidate. In the FIG. 4 example, each of the concepts is represented by a pattern. In some embodiments, the pattern text is the same as the concept text (e.g., the pattern "Princeton University" is the same as the concept "Princeton University). In other embodiments, the pattern differs somewhat from the concept, and can be an abbreviation of the concept (e.g., "Stanford University") or a synonym for the concept. In some embodiments, the pattern is also broken down into one or more tokens, as shown in FIG. 4. The representation in the form of a pattern and tokens can be used by the CSME 101 to identify the associated concepts in the input string of text. The collection of concepts with associated patterns and tokens can be stored in a knowledge base 301, and the information in the knowledge base 301 can be retrieved when needed to conduct a particular matching.

Token Matching

Referring again to FIG. 3, the token matching module 306 identifies a token match between the one or more input tokens and the one or more pattern tokens. Thus, the token matching module 306 can identify possible correspondences between input tokens in the input string of text and pattern tokens in the textual description of concepts. According to the example above, the input string "I attended Stanford University from 1986 to 1993" is decomposed into tokens as follows:

<I> <attended> <Stanford> <University> <from> <1986> <to > <1993>

The token matching module 306 can then identify which patterns of which concepts in a canonical set of concepts have tokens (e.g., pattern tokens) that correspond to tokens in the input string (e.g., input tokens). In the above example, the module 306 might identify a correspondence between the third input token, <Stanford>, and the input token of the pattern "Stanford University." The token matching module 306 might also identify a correspondence between the fourth token, <University>, and the second token of "Stanford University." The module 306 might further identify a match between the input token <University> and pattern "Princeton University," but would not identify a match with the concept "Harvard University" since the textual description or pattern representing this concept does not include the word "University."

In some embodiment, the token matching module 306 is configured to identify an input string that is a synonym of a token by being a subordinate concept to a parent concept represented by the token. For example, the input might include the input string "I attended Radcliff College and Princetn University," where Radcliff is a college within Harvard University and "Princetn" is likely to be a misspelling of "Princeton." In these embodiments, the token matching module 306 is configured to identify the input string "Radcliff College" as a synonym for Harvard University, since Radcliff College can be represented as a child concept of the concept Harvard University in the concept hierarchy (e.g., see FIG. 1b for an example of the concept hierarchy) and it is possibly represented with pattern "Radcliff College." Thus, when the token <Radcliff> appears in the input string of text, the module 305 can match the text to the input token in the tokenization of "Radcliff College." In this example, child concepts inherit characteristics or attributes of the parent concept, hence, in this case, are "part-of" the parent concept. As another example, since the concepts represented by the representation module 304 can have one or more patterns or synonyms, "Radcliff College" can be included as a pattern or synonym of concept Harvard University.

In addition, in the example above, the token matching module 306 can be configured to identify misspellings, such as "Princetn" as a likely misspelling of "Princeton." This allows token matches between input tokens and pattern tokens that are not exact. In some embodiments, this is accomplished by measuring the distance between input tokens and pattern tokens using a string similarity metric (e.g., the Jaro-Winkler metric or any other similarity metric). In some embodiments, the similarity metric is scaled to provide a real number in the range 0.0 to 1.0, where 0.0 is perfect mismatch between input and pattern tokens (e.g., no tokens are matched) and 1.0 represents a perfect match (e.g., all tokens are matched).

The token matching module 306 can compute for each input token a set of matching pattern tokens (e.g., pattern tokens that are either identical to or are similar enough to the input tokens to be considered equivalent to the input tokens). In some embodiments, the module 306 does this by employing a token evaluation function (e.g., tokenCloseness(InputToken t1, PatternToken t2)) that evaluates the closeness of a input token to a pattern token, producing a value in the range [0.0, 1.0] with 1.0 being a perfect match and 0.0 being a perfect mismatch. The token matching module 306 preferably employs a thresholding function (e.g., tokenMatch (InputToken t1, PatternToken t2)) that returns values (e.g., TRUE (the tokens match), FALSE (the tokens do not match), INDETERMINANT (cannot determine whether the tokens match of do not match)). This function can be used to determine whether an input token in the input string should be treated as a match for a pattern token in a pattern.

In addition, a number of modifiers can be employed in the CSME 101 for usage in matching tokens. One example is the "class modifier" that is used to modify a particular class of lexical constructs. For example, to match the concept "Oracle Database System" or "Oracle 8i," a pattern such as "Oracle #8 i" could be used, which can be decomposed into tokens to form the following token sequence:

<Oracle> <#8> <i>

In this example, the class modifier is represented by the pound sign, or "#," but the modifier can be represented by any symbol, letter, number, character, sequence of characters, etc. The modifier signifies that any input term that is of the same class as the token following the pound sign (e.g., an integer) matches the pattern. In the Oracle example, the pound sign is actually a modifier for the term "8" that follows it. Thus, the token matching module 306 would also identify text "Oracle 7i" as a match for the pattern "Oracle #8 i," since "7" is an integer and in the same class as "8." This class modifier can also be used with words, real numbers, symbols, and the like.

An "exact modifier" is another example of a modifier that can be used, and is here denoted as a single quote mark or "'", but can be denoted by another character. This modifier may appear in front of any word or associated with any token. For example, when the exact modifier is used in front of a word, only input words that exactly match the spelling of the token following the modifier are acknowledged as matches. For example, the pattern "'Oracle 8 i" would only be matched by text "Oracle 8 i" and not by "Oracel 8 i" or any other spelling. The exact modifier can be used to override any default behavior that allows word tokens to match closely spelled words.

As still another example, a "stem modifier" can be used, and can be denoted by a tilde symbol or "," or any other character. When matching words, it can be beneficial to match all morphological variants of the verb in some cases. In some embodiments, when this modifier appears in front of any pattern or pattern token that is a word, input words or tokens whose stem matches the stem of the word will be considered matches for the token. For example, the phrase "I attend Stanford University" would be matched by "I attended Stanford University." The CSME 101 can thus support a number of patterns, including some involving a specific word, integer, symbol or real number, a class of words, integers, symbols, or real numbers, a stemmed word, an exact word, and the like.

Figure 5:
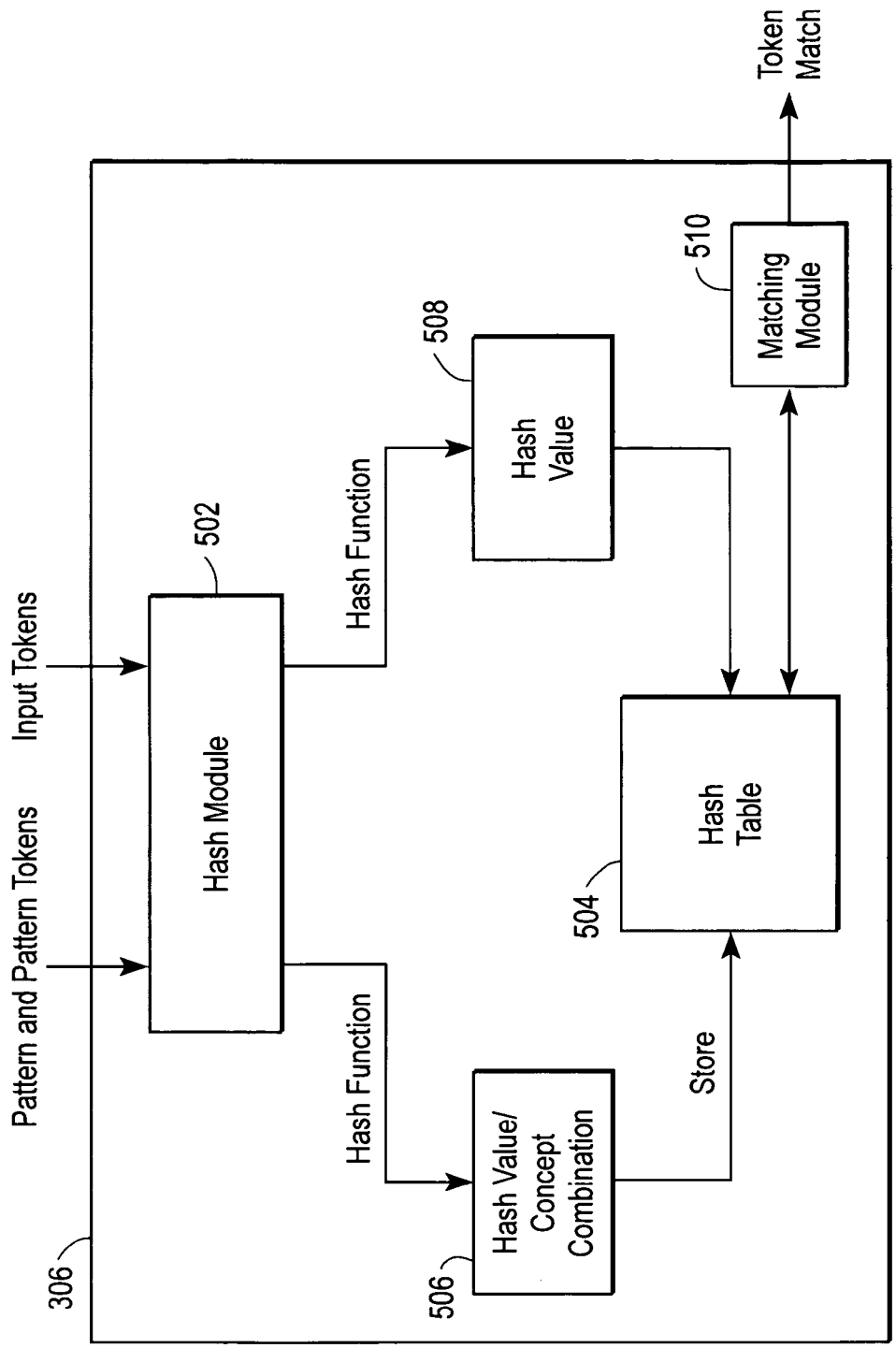
FIG. 5 is a high-level block diagram illustrating the functional modules within the token matching module 306, according to one embodiment of the present invention.

Referring now to FIG. 5, there is shown a high-level block diagram illustrating the token matching module 306 in more detail and its functional modules, according to an embodiment of the system 100. It is feasible for the token matching module 306 to compare each input token to each and every pattern token associated with a pattern of every concept when performing a token match, but this comparison process can be slow. Thus, in some embodiments, the token matching module 306 creates a hash table 504 for each pattern type used by the CSME 101. The hash module 502 can apply one or more hash functions to each pattern of each concept, placing the resulting hash value/concept combination 506 in the appropriate hash table 504. To perform token matching, the hash module 502 can then hash each token using the same hash functions. The matching module 510 can then look up the hash values 508 in the corresponding hash tables. When a match or collision is found, it is possible to identify a token match, and thus identify the pattern and the concept that contains that pattern using the hash table 504. In the case of misspelled words, in some embodiments the token matching module 306 measures the similarity of the input token to the word in the pattern using a similarity metric (e.g., the Jaro-Winkler similarity metric). In some embodiments, the input tokens or sequences of tokens are mapped to other input tokens or sequences (e.g., mapping related terms, such as "Software Developer" to "Software Engineer"). In this manner, it is possible to account for possible variations in the different tokens.

When selecting a hash function to use for a pattern type, the hash module 502 can use numerous different types of functions. For example, for a "stemmed word" pattern type, the hash function can be the morphological stem of the word, and a stemming algorithm can be used for these hash functions (e.g., the Porter stemming algorithm). As another example, for the patterns that are constructed from a class modifier, it is possible to maintain a separate hash table 504 for each pattern type. However, in some embodiments, a single hash table 504 is maintained for all class modifier pattern types. For example, if there were only four basic patterns types, the hash function produces one of four values, corresponding to the four basic pattern types. In this way, all input tokens of a particular class can be matched to all patterns of that class.

In addition, other hash functions can be used in cases in which the hash function will produce multiple values from a single pattern (e.g., in the case of the potentially misspelled word). In some embodiments, to capture words that sound the same when pronounced, the hash module 502 hashes each word into a metaphone (e.g., Lawrence Philips' Metaphone Algorithm). Further, to capture input words that have omitted a single character or phoneme, transposed a single character or phoneme, or included an extraneous character or phoneme, the hash module 502 can compute from the metaphone every sub-string that is missing at most one character. This can result in a set of strings that can be used as hash values 508 for matching misspelled words.

Pattern Matching

The pattern matching module 308 identifies a pattern match between one of the one or more sub-strings and the pattern based on the token match. In some embodiments, the pattern matching module 308 receives patterns for matching from the representation module 304 or directly from the knowledge base 301. It is possible to define two classes of evidence with regard to a match. Positive evidence can include actual letters, numbers, words, and symbols in the input that are also contained exactly in the pattern (e.g. letters of an input word that also occur in a particular pattern word or words in an input string that also occur in a pattern). Negative evidence can include actual letters, numbers, words, and symbols in the input that are not contained in the pattern (e.g. extra letters in a misspelled word or words in an input string that match no word in a pattern).

In some embodiments, the module 308 identifies which concepts have patterns that are likely to be matched and evaluates how closely various sub-strings of the input string match the pattern. For example, with the input string "I attended Stanford University from 1986 to 1993," there is a correspondence between the third token in the string <Stanford> and the first token on the pattern "Stanford University," and between the fourth token "University" and the second token on the pattern "Stanford University." Thus, based on these token matches, the module 308 can identify the sub-string "Stanford University" in the input string as a perfect match to the pattern "Stanford University."

In some embodiments, the sub-string of the input string is composed of a number of words, symbols, integers, real numbers etc., as shown in the example above. However, in some embodiments, the sub-string being matched is composed of one word, and the input token formed from this one word is matched with a pattern token of a pattern. For example, in "I attended Harvard University," the token <Harvard> matches with the token on the pattern "Harvard," so the sub-string "Harvard" matches the pattern "Harvard."

The CSME 101 can support a number of basic patterns that can be the fundamental building block for token matching. In some embodiments, a basic pattern is composed of just one word, character, number, symbol, etc. (e.g., "Harvard") or a simple sequence (e.g., "Stanford University"). In some embodiments, a basic pattern matches only a single token of an input string. Beyond these basic patterns, it is also possible for a pattern to be composed of more than one word, a more complex sequence of words, or a number of sub-patterns to form a compound pattern. A compound pattern can include numerous words, characters, etc. In some embodiments, it is possible for a compound pattern to match a sequence of tokens or a substring of text in an input string.

The CSME 101 can support a number of compound pattern types. For example, a "set compound pattern" can be a composition of other patterns that is matched if zero or more of its component patterns or sub-patterns (e.g., basic patterns) is matched. An example of a compound pattern is the pattern comprising the basic pattern "Princeton" and the basic pattern "University." However, in some embodiments, the general definition of the set pattern is recursive. Thus, sub-patterns may be any other pattern, including other set patterns. In some embodiments, the only constraint on matching the set pattern is that no two basic patterns match the same input token.

Another example of a compound pattern is the "sequence compound pattern," which is also a composition of other sub-patterns. In some embodiments, the sequence pattern is identical to the set compound pattern, except that an additional constraint is imposed where the sequence compound pattern is matched only if, for all pairs of matched basic patterns, the order of appearance of the input tokens is the same as the order of the appearance of the basic patterns in the target pattern. This pattern can be used for distinguishing cases where word order is extremely important, such as the case of "University of Texas" and "Texas University," two very different institutions. Still another example of a compound pattern is the "alternative compound pattern." In some embodiments, this pattern is matched if and only if one of more of its sub-patterns is matched. The alternative compound pattern can be useful for capturing lexical synonyms, abbreviations, and acronyms, such as "Microsoft Windows" or "Windows" or "WinXP" or Windows XP."

As yet another example, it is also possible to use a concatenation constraint, where a sequence of concatenated patterns is applied. Multiple adjacent tokens can be concatenated in the input string and still be matched. In addition, it can be required that the matched tokens follow the order of the patterns.

The pattern matching module 308 can also determine whether a particular matching of input tokens to basic patterns satisfies all of the constraints on the pattern. For example, if every input token is assigned to at most one basic pattern, the module 308 can evaluate whether the assignment matches the pattern in time linear in the number of basic patterns. In some embodiments, the module 308 constructs all valid assignments of input tokens to basic patterns simultaneously, using a recursive algorithm on the pattern. For example, the module 308 can be used in an attempt to match the sequence pattern "Texas A&M University." To determine possible matches of "I went to the University of Texas in Austin, Tex.," the tokenization module 302 would tokenize the input string into:

<I> <went> <to > <the> <University> <of > <Texas> <in > <Austin> <,> <Texas>

Both tokens matching "Texas" can be assigned to the basic pattern "Texas," and the token <University> can be assigned to the basic pattern "University." In some embodiments, the sub-patterns of the input string are recursively evaluated, and a set of correspondences between input tokens and basic patterns is produced. For the sequence pattern, the module 308 can compute all possible sub-sets of the correspondences to the sub-patterns that may appear in the input string sequentially. In this example, it would be possible to generate four possible matchings: 1) the empty matching, 2) the matching of the seventh input token, <Texas>, to the first basic pattern "Texas," 3) the matching of the $11^{th}$ input token, <Texas>, to the first basic pattern "Texas," and, 4) the matching of the $5^{th}$ input token, <University>, to the fifth basic pattern, "University." While each of these matches is valid, intuitively none of the matches is correct, thus indicating the value of scoring the quality of a matching.

Pattern Scoring

Scoring Basic Patterns

The pattern scoring module 310 scores the pattern match based on the token match. In some embodiments, a pattern evaluation or scoring function is used in scoring the match. The scoring function can take a matching (e.g., a correspondence between an input token and a basic pattern), and compute a score. In some embodiments, the higher the score received for a match, the more closely the input string matches the pattern. In some embodiments, this input is taken under the constraint that no matching may use the same token in the input or in the pattern (e.g., there can be no overlapped matchings among input tokens on the input string or among pattern tokens on the pattern).

As one example, a scoring function could be used that produces a real number in the range of 0.0 (for perfect mismatch) to 1.0 (for perfect match), analogous to the token matching similarity metric. However, the output of the scoring function can be represented in other manners, as well (e.g., as an integer). In the example described above with the input string "I attended Stanford University from 1986 to 1993" that resulted in identifying the sub-string "Stanford University" in the input string as perfect match to the pattern "Stanford University," the scoring function might return a value of 1.0.

There are a number of different manners in which a score for a pattern matching can be determined. In some embodiments, the pattern scoring module 310 assigns each basic pattern a weight. The weight assigned is drawn from a weight table 303 that is stored independently of the pattern. Weights in the weight table 303 can be set by the user, but a set of weights can also be pre-set by default in the system 100 (e.g., all basic patterns given a weight a 1). In some embodiments, the user can modify the weights as desired (e.g., the employer can modify the weights associated with different desired features for a job applicant to experiment with different weights to find an arrangement that produces the best candidates).

As one example, a selection of text, "I went to Princeton University" can be scored against two patterns "Harvard University" and "Princeton University." If the first pattern is scored on the input string, the module 310 would return a positive score because the input token "University" matches the basic word pattern "University." In this example, the contribution to the score of the input token "University" on the pattern "Harvard University" is determined by the weight of "University" in the weight table 303. If all of the basic patterns were given a weight of 1, then each of the three basic patterns, "Harvard," "University," and "Princeton" would each get a weight of 1, affecting how each basic pattern would contribute to the overall score for the matching. It is also possible to use weights of patterns to distinguish more important patterns over less important patterns, which is discussed in more detail below.

Examples of Scoring Functions

One example of a scoring function that could be used would involve defining the score of a given matching (e.g., a set of correspondences between an input token and a basic pattern) on a particular pattern as the sum of the weights of the matched basic patterns divided by the sum of the weights of all the basic patterns in the pattern. Thus, in the example above regarding Harvard and Princeton, this scoring function would score the matching of the input token "University" to the basic pattern "University" in the pattern "Harvard University" as 0.5, since only one of two basic patterns is matched. For the pattern "Princeton University," the scoring function would return a score of 1.0, since all basic patterns were matched.

While the example of a scoring function described above did properly give a higher score to the input string on the pattern representing Princeton University than to the pattern representing Harvard University, this scoring function may not work as well with some other input strings. For example, with the input string "I lived in Princeton, N.J. while I attended Rutgers University," the fourth input token, <Princeton>, might be matched to the basic pattern of "Princeton University," and the eleventh input token <University> to the basic pattern of "Princeton University." Evaluating this matching using the scoring function described above might return a perfect score of 1.0, but this matching would not be valid.

As another example, a different scoring function is used that takes into consideration the input tokens that are not matched, particularly those that lie between the first matched input token and the last matched input token. In the example above regarding Rutgers University, there are six input tokens that are not matched (e.g., <,> <NJ> <while> <I> <attended> <Rutgers>). Conceptually, the scoring function can score the sub-sequence of input tokens between the leftmost matched token in the input string and the rightmost matched token in the input string versus the pattern. The scoring function can involve two parts: a factor determined by which tokens in the input string are matched and not matched, and a factor determined by which basic patterns in the pattern are matched and not matched. This scoring function can construct a score as the product of a) the ratio of the weights of the matched input tokens to all tokens in the input string between and including the leftmost and rightmost matched input tokens, and b) the ratio of the weights of the matched basic patterns to all the basic patterns. When applied to the input string "I lived in Princeton, N.J. while I attended Rutgers University" on the pattern "Princeton University," the result is the following:

$$(2/8)*(2/2)=0.25.$$

Thus, this scoring function properly returns a much lower score for the match on the "Princeton University" pattern than the scoring function described in the previous example. In addition, distance constraints can be used to put a limit on the number of unmatched tokens between the first matched token and the last matched token.

Handling Mis-Ordered Words

In many scenarios, token order is also important. The scoring function can be optionally modified or augmented in a number of ways to account for ordering of tokens As one example, the scoring function can be augmented with a penalty function if tokens are out of order. In any compound pattern used by the CSME 101 that allows the input tokens to be presented in an order distinct from the order of basic patterns only in a single construct (e.g., the set compound pattern in the examples described above), this penalty function example can be useful for application to the portion of the score attributed to basic tokens contained in such a pattern when those basic tokens appear out of order. For example, the number of inversions present among the sub-patterns of a set compound pattern can be computed. If no inversions are present (e.g., none of the sub-patterns are out of order), then the penalty function returns a value of 0.0. If the sub-patterns in the set compound pattern are matched to input tokens that appear in exactly the opposite order, then the penalty function returns a value of 1.0. Thus, in this example, the score can be reduced by the product of the penalty function and a constant penalty value. In some embodiments, this value ranges from 1% to 50% of the score.

Distinguishing Important Sub-Patterns

In some embodiments, it is possible to distinguish that certain sub-patterns forming a compound pattern are more or less important than other sub-patterns. In some embodiments, the scoring function applied by the pattern scoring module 310 assigns a higher score to important patterns that are matched than to similar, but less important patterns that are matched. Conversely, a lower score can be assigned to important patterns that are not matched compared to similar, but less important patterns that are not matched.

In some embodiments, sub-pattern importance is conveyed by the pattern scoring module 310 using a weight function. The weight function can be computed by the module 310 using a representative sample of the texts that are likely to be input into the system 100. From that sample (e.g., possibly matching thousands of concepts), it is possible to construct the weight table 303 based on the inverse of the frequencies of the occurrence of the basic patterns in the sample set. This can be the same weight table 303 as previously described or it can be a separate weight table for storing weights based on the inverse of frequencies of occurrence of patterns. For example, in an input consisting of a set of 10,000 names of schools of higher education, the importance of the basic pattern "University" would be very low, since its frequency would be very high, whereas the importance of the basic pattern "Princeton" would be very high, since very few schools are named Princeton.

Distinguishing Optional and Required Patterns

In some embodiments, certain basic patterns are entirely optional or absolutely required for the pattern to be considered matched. In these embodiments, optional patterns contribute to the score of a pattern match only when the contribution would be positive. Similarly, required patterns are considered matched only when the score of the required sub-pattern exceeds a minimum score threshold, in these embodiments. A "required" or an "optional" constraint can be used with a pattern to designate that a particular pattern or term is required or optional for a match to be found.

Pattern Selection

The pattern selection module 312 determines whether the concept is present in the input string based on the score, wherein which one of the one or more sub-strings of text in the input string naming the concept is identified based on the token match. In some embodiments, the pattern selection module 312 selects from the likely matches a set of non-conflicting matches (e.g., matches that do not overlap). The module 312 can select the pattern match with the total weight that is highest and that does not overlap any other pattern matches for the input string. For example, the input string "I went to Princeton, University of Southern California, and State University of New York," likely matches may include input substring "Princeton, University" for concept Princeton University and input substring "California, and State University" for concept California State University. However, this type of match would be taking the terms matched out of context. Thus, the scoring function can seek select an optimal set of concepts matches by maximizing the sum of the scores of the matched sub-strings under the constraint that no two sub-strings overlap. In some embodiments, a dynamic programming technique can be employed to perform the selection.

In some embodiments, a matching between input tokens and basic patterns within a single pattern can be classified using a threshold function. The score assigned to a matching can encode how well the matching fits the pattern. One method of classifying whether the matching is a reasonable fit for the pattern is to compare the score to a fixed threshold score. Matchings with scores exceeding the threshold value can be considered plausible matches. Those with scores that do not meet the threshold value can be considered implausible matches. For example, if the score is below a given value, the input sub-string spanned by the first term in the matching (e.g., "Princeton" in the above example) and the last term in the matching (e.g., "University") according to the order of input tokens is deemed to be an implausible match for the pattern (e.g., the pattern "Princeton University").

In one example, let $c[i]$ be the i-th character of the input text. For a plausible match P, let interval(P) be the smallest closed integer interval that contains the indices of all characters in matched input tokens in P. In this example, two matches P and Q are non-conflicting if and only if interval(P) does not intersect interval(Q). Intuitively, P and Q are non-conflicting if and only if P and Q match different sub-sequences of the input text. A weight for a matching P can be defined as weight(P) or the product of the square of the score of P and the sum of the weights of the basic patterns in P. The pattern selection module 312 can identify (e.g., using dynamic programming) a set of mutually non-conflicting matches whose total weight (e.g., maximum weight) is maximized. When selecting between two conflicting matchings, P and Q, the module 312 can select the one whose weight is larger. When combining non-conflicting matchings, the weight of the combined set of matchings can be set as a) the sum of the weights of the matchings where multiple matchings are sought, or b) the maximum of the weights of the two sets of matchings where only a single matching is sought.

Importance Indexing

As explained above, in some embodiments, for a matching to be considered, its score must exceed a given threshold value. It is also possible to eliminate a large number of patterns without scoring them. For example, when trying to find schools in the text "I went to university at Princeton," conceivably the fourth token of this text <university> matches every instance of the basic pattern "University" in the collection of basic patterns in the knowledge base 301. Following the algorithm described above, each one of those patterns would be scored, though it may be discovered that the scores were too low to be used for the vast majority of concepts in the knowledge base 301.

In some embodiments, to reduce the scoring effort, the pattern selection module 312 computes an importance value for each basic pattern within a pattern. In these embodiments, if the importance value exceeds the scoring threshold value, then the pattern is scored. The module 312 maintains an importance index 305 that includes, for each basic pattern, the list of patterns that contain the basic pattern and the corresponding importance values. The list can be sorted by importance values. The importance index 305 can be used to find an input token that corresponds to a basic pattern and to identify all patterns whose importance value exceeds the threshold value. These patterns exceeding the threshold can be added to a list of patterns that will be completely scored. Thus, this importance indexing technique can dramatically reduce the number of patterns that need be scored, and, consequently can result in a much faster CSME 101.

There are a number of ways to compute the importance values of the basic patterns within a pattern. For example, the module 312 can construct a total order on the set of distinct basic patterns. The module 312 can construct an input text whose score is maximal (e.g., 1.0) and then for each basic pattern, the module 312 can remove all instances of that basic pattern from the input text. The module 312 can also score the resulting input text. The basic pattern that achieves the lowest score can be assigned the highest score achieved when including that basic pattern. Then, that basic pattern can be removed and the second step can be repeated until there are no basic patterns remaining.

Measure of Effectiveness

To measure the effectiveness of a method for solving the problem of identifying concepts in a selection of text, it is possible to define a measure of the accuracy of a solution in correctly identifying concepts. When given a fixed set of concepts or a canonical set of concepts to be identified and an input string or selection of text, T, it is possible to enumerate all the matchings, M, of sub-selections or sub-strings of text with concepts in the canonical set. For example, given a set of matchings H(T) that might be made manually by a human reviewing a string of text, it is possible to measure the precision, recall, and accuracy of another method, C(T) (e.g., the method used by system 100), for generating matchings on T relative to M as follows:

Precision: The number of concepts matched in both H(T) and C(T) divided by the number of concepts matched in C(T).

Recall: The number of concepts matched in both H(T) and C(T) divided by the number of concepts matched in H(T).

Accuracy: The average of precision and recall.

F-Measure: (2*Precision*Recall)/(Precision+Recall)

The system 100 can be configured to achieve the highest F-Measure or Accuracy possible. To obtain this outcome, it is useful to define a measure of goodness relating a sub-selection of text and a concept (e.g., how good or accurate the identified match made by system 100 is in comparison to the match a human might make through a manual matching). The measure of goodness can correspond well to intuition that a human being would apply when measuring goodness. For example, in a selection of text assumed to name a single city or school, e.g. "Stanford," a resident of Northern California may recognize this as an abbreviation of "Leland Stanford Jr. University," while a resident of Connecticut may recognize this as a misspelling of the city of Stamford, Conn. Without further contextual information, it may be difficult to make a determination of which concept is a closer or better match. Thus, a reasonable measure of goodness or closeness can allow for abbreviations and allow for spelling errors.

In addition to abbreviations and spelling errors, a goodness measure can also recognize synonyms of concepts, including both single word synonyms, e.g. "taught" and "instructed" and multi-word synonyms, e.g. "developed software" and "wrote code." Other relationships between words can also be used to construct a goodness measure, including the various relationships represented in the electronic lexical database called WordNet. The system 100 provides a class of methods for measuring goodness that can be constructed using one or more hierarchies of concepts defined with words and/or word synonyms, and it is possible to achieve very high levels of accuracy when using methods of goodness constructed from such concept hierarchies.

Figure 6:
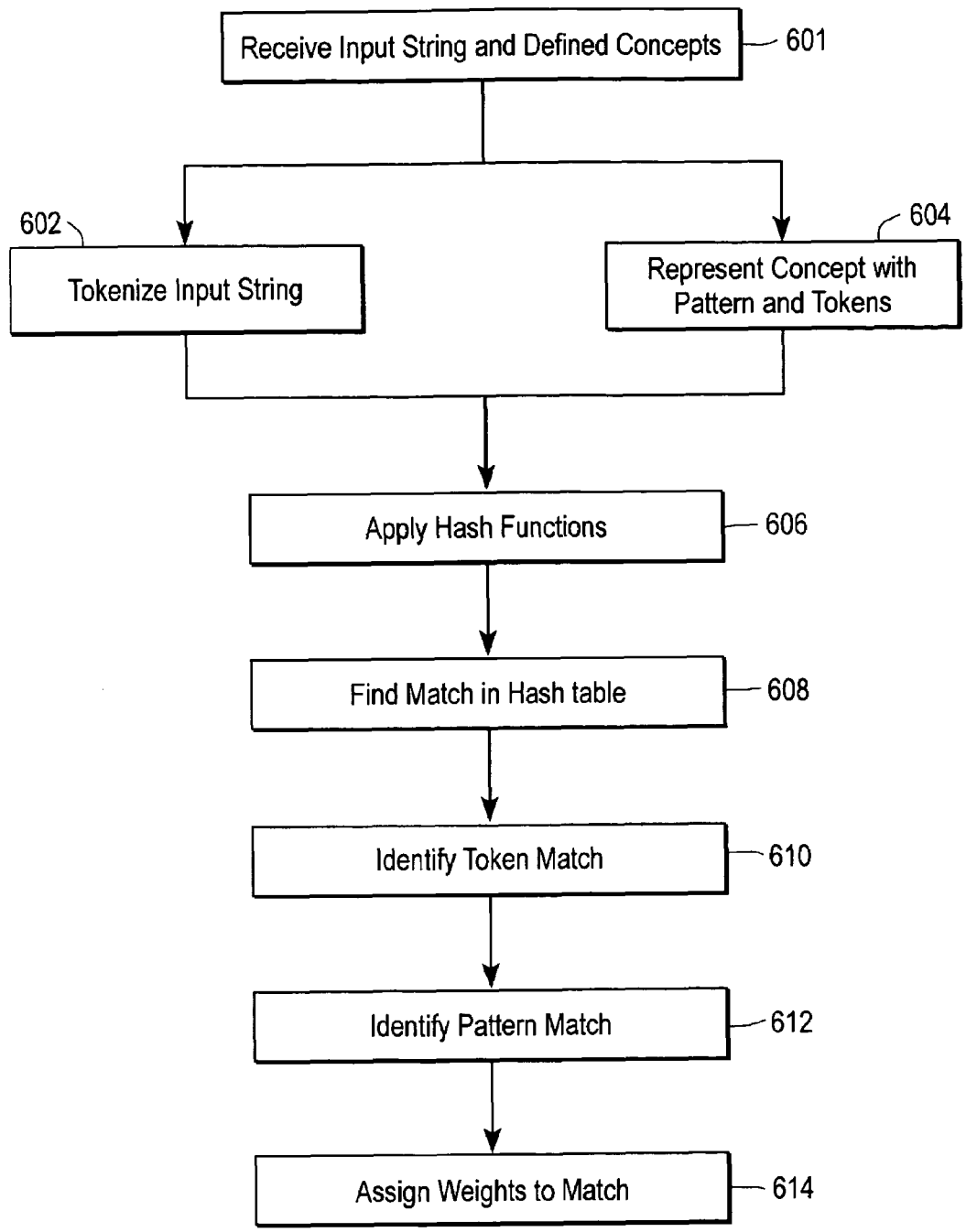
FIG. 6 is a flowchart illustrating steps performed by the concept synonym matching engine 101, including tokenization, token matching and pattern matching, according to one embodiment of the present invention.

Referring now to FIG. 6, there is shown a flowchart illustrating the operation of the CSME 101. Specifically, FIG. 6 illustrates the steps performed by the CSME 101 in tokenization, token matching and pattern matching. It should be understood that these steps are illustrative only, and that different embodiments of the CSME 101 may perform the illustrated steps in different orders, omit certain steps, and/or perform additional steps not shown in FIG. 6 (the same is true for FIG. 7).

As shown in FIG. 6, the CSME 101 first receives 601 an input string of text (e.g., from a resumé, from a job description, etc.) and a defined set of concepts (e.g., from a knowledgebase of concepts). In some embodiments, the input string is normalized by mapping characters from one character set into characters in another character set. The CSME 101 tokenizes 602 the input string, dividing the input string into one or more input tokens, as described above. The CSME 101 also represents 604 a concept with one or more patterns that can be divided into tokens. This representation is preferably created in advance and lists a number of concepts to be identified in selections of text or input strings. In some embodiments, the input tokens or token sequences are mapped to other input tokens or sequences. The CSME 101 applies 606 hash functions to each pattern of each concept and places the resulting hash value/concept combination 506 in a hash table 504. The CSME 101 can also apply 606 the hash functions to each input token to be matched to get a resultant hash value 508. After applying 606 the hash functions, the CSME 101 can then look up the hash value 508 in the hash table 504 to find 608 a match in the hash table 504. Thus, CSME 101 identifies 610 a token match between one or more input tokens and one or more pattern tokens using the information stored in the hash table 504.

The CSME 101 can also identify 612 a pattern match between a sub-string (e.g., one or more of the input tokens) of the input string and a pattern associated with the concept to be identified. The CSME 101 then assigns 614 a weight to the match that can be used in the computation of a score for the match. The CSME 101 can assign weights to each basic pattern within a pattern that together equal the total weight for the pattern, and the user can modify the weights as desired. The CSME 101 can assign 614 a lower weight to less important of the basic patterns, and a higher weight to more important of the basic patterns. Similarly, the CSME 101 can assign a lower weight to more frequently used patterns (e.g., University) and can assign a higher weight to less frequent patterns (e.g., Harvard).

Figure 7:
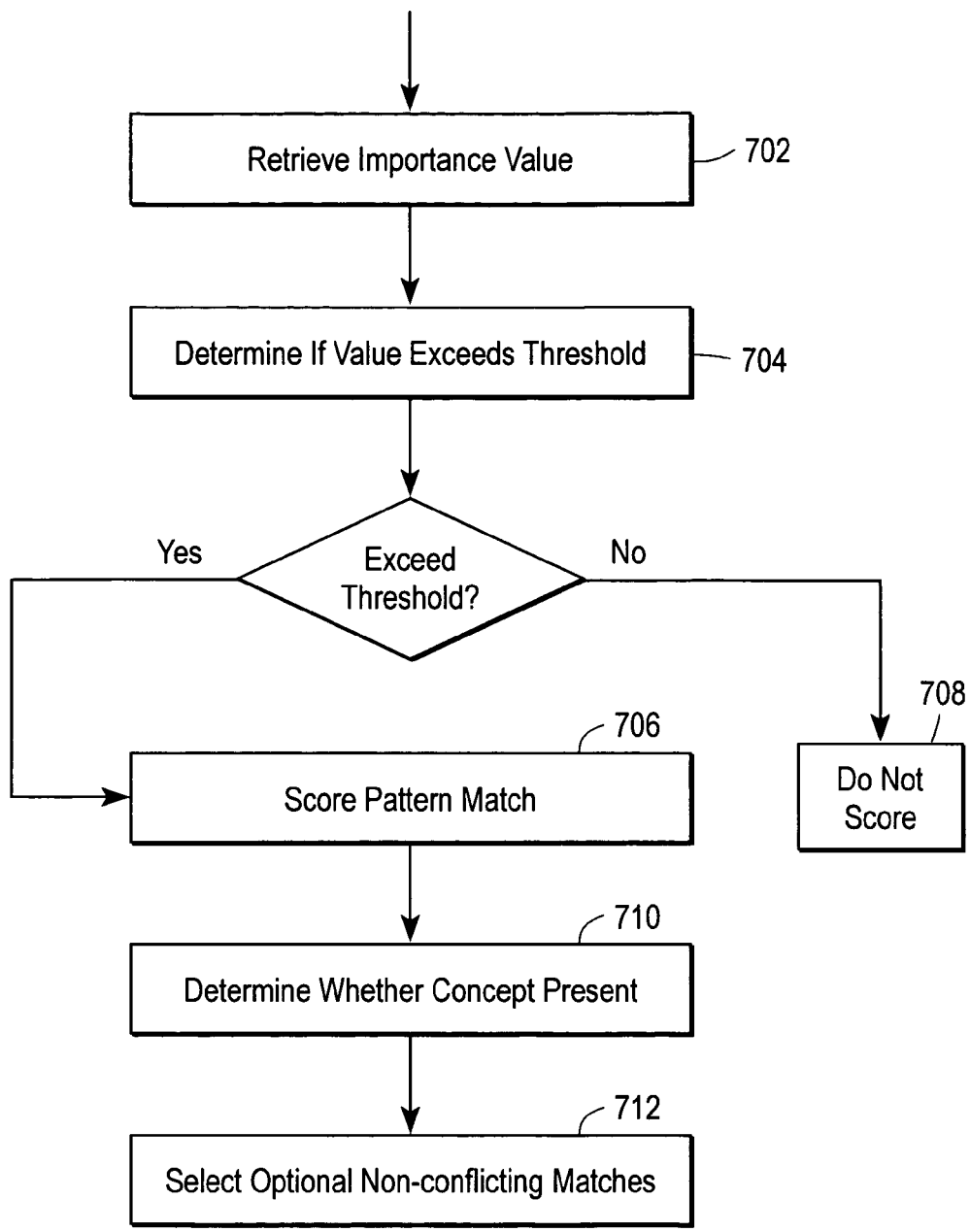
FIG. 7 is a flowchart illustrating steps performed by the concept synonym matching engine 101, including pattern scoring and pattern selection, according to one embodiment of the present invention.

Referring now to FIG. 7, there is shown a flowchart illustrating the operation of the CSME 101. Specifically, FIG. 7 illustrates the steps of the CSME 101 involving pattern scoring and determining whether a concept is present in a selection of text. The CSME 101 retrieves 702 an importance value for each basic pattern within a pattern from an importance index 305 (e.g., containing, for each basic pattern, a list of patterns that contain the basic pattern and the corresponding importance values). The importance index 305 can be used to find an input token that corresponds to a basic pattern and to identify all patterns whose importance value exceeds the threshold value for a likely or plausible match (as described above). The CSME 101 next determines 704 if the importance value exceeds the threshold value. If the importance value does not exceed the threshold, the CSME 101 does not score 708 the pattern match. If the value does exceed the threshold, the CSME 100 does score 706 the pattern match. In some embodiments, the CSME 101 conducts some scoring 706 of the pattern match before the retrieval 702 of the importance value, but the CSME 101 completes the scoring 706 once the importance value is retrieved 702 and is determined 704 to exceed the threshold. The CSME 101 scores 708 the pattern match based the weights assigned to basic patterns making up the pattern that together equal the total weight for the pattern.

The CSME 101 next determines 710 whether the concept is present in the input string based on the score. In some embodiments, the CSME 101 selects 712 from the likely matches a set of optimal, non-conflicting matches (e.g., matches that do not overlap). Again, the CSME 101 can compare the score to a threshold score to determine how plausible or likely the match is and select 712 the optimal match. The CSME 101 selects 712 the pattern match with the total weight that is highest (e.g., the maximal total weight) and where the pattern match does not overlap any other pattern matches for the input string. The CSME 101 can apply dynamic programming techniques or other methods to select the matches that are non-conflicting or that include sub-strings that do not overlap. Thus, using these methods, the CSME 101 ultimately can automatically identify from a potentially unstructured input string of text one or more specific concepts, where the input string may include errors and/or variations in the text.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product having a computer-readable storage medium storing computer program instructions that identify a parent concept referenced in an input string of text by determining the presence of a child concept in the input string, the computer program instructions comprising instructions that when executed by a processor cause the processor to perform the steps of:

storing a plurality of concept hierarchies, each concept hierarchy comprising a plurality of concepts in a knowledge base, including parent concepts and child concepts, wherein each child concept inherits characteristics of a parent concept, wherein each concept is represented in the knowledge base by a pattern which comprises one or more pattern tokens, wherein at least some of the patterns representing concepts comprise multiple pattern tokens that are associated with each other by a set of constraints;

dividing the input string into input tokens that represent sub-strings of text within the input string;

identifying at least one token match between any of the input tokens and any of the pattern tokens representing a child concept in the concept hierarchies;

identifying at least one pattern match between sub-strings of the input string that are comprised of more than one of the matched input tokens and the pattern representing the child concept based on the token match and the set of constraints for the pattern;

scoring the at least one pattern match based on the corresponding token match to provide at least one match score; and determining which of the child concepts are present in the input string based on the corresponding match score, wherein a plurality of child concepts, contained in a plurality of concept hierarchies, is present in the input string, the presence of the child concepts in the input string identifying that at least one parent concept is referenced in the input string of text.

2. The computer program product of claim 1, wherein determining which of the child concepts are present in the input string further comprises identifying a sub-string of text in the input string as naming the child concept present in the input string based on the token match.

3. The computer program product of claim 1, wherein the concept is represented by one or more patterns that are synonyms describing the concept, and wherein any of the one or more patterns can be used to identify the concept.

4. The computer program product of claim 1, wherein the pattern includes a modifier that modifies how the pattern is interpreted.

5. The computer program product of claim 1, further comprising:

applying a hash function to the pattern to obtain a first hash value for the pattern that is stored in a hash table;

applying the hash function to the input tokens to obtain a second hash value; and finding a match between the first and second hash values in the hash table.

6. The computer program product of claim 1, wherein the pattern is a compound pattern composed of sub-patterns, each sub-pattern comprising input tokens, wherein the compound pattern selected from a group consisting of: set compound pattern, sequence compound pattern, alternative compound pattern, concatenation pattern, required pattern, optional pattern, more important pattern, and less important pattern.

7. The computer program product of claim 6, wherein the compound pattern is a sequence compound pattern that is matched when order of appearance of the input tokens in the sub-strings matches order of appearance of the sub-patterns in the compound pattern.

8. The computer program product of claim 1, wherein the token match is identified when characters forming the input tokens are substantially similar to characters forming the pattern tokens.

9. The computer program product of claim 1, wherein the pattern is comprised of basic patterns, selected from a group consisting of a character, a symbol, a number, a stemmed word, and an exact word.

10. The computer program product of claim 9, wherein scoring the pattern match further comprises:

assigning each of the basic patterns a weight; and calculating the match score that comprises an overall score for the pattern based on the weight.

11. The computer program product of claim 10, wherein assigning each of the basic patterns a weight further comprises assigning a lower weight to less important of the basic patterns.

12. The computer program product of claim 10, further comprising calculating an importance value for each of the basic patterns, wherein the pattern is scored only when the importance value exceeds a threshold value.

13. The computer program product of claim 1, wherein scoring the pattern match further comprises taking into consideration the input tokens in the input string that are unmatched and that lie between the input tokens that are matched.

14. The computer program product of claim 1, wherein determining which of the child concepts are present in the input string based on the match score further comprises:

comparing the match score for the pattern match to a threshold score; and selecting a substantially plausible match, wherein the pattern match is considered substantially plausible when the match score exceeds the threshold score.

15. The computer program product of claim 1, wherein determining which of the child concepts are present in the input string based on the match score further comprises selecting the pattern match to apply based on the match score, wherein the pattern match selected is non-conflicting with other pattern matches in the input string.

16. A computer-implemented method of identifying a parent concept referenced in an input string of text by determining the presence of a child concept in the input string, the method comprising:

storing a plurality of concept hierarchies, each concept hierarchy comprising a plurality of concepts in a knowledge base, including parent concepts and child concepts, wherein each child concept inherits characteristics of a parent concept, wherein each concept is represented in the knowledge base by a pattern which comprises one or more pattern tokens, wherein at least some of the patterns representing concepts comprise multiple pattern tokens that are associated with each other by a set of constraints;

dividing the input string into input tokens that represent sub-strings of text within the input string;

identifying at least one token match between any of the input tokens and any of the pattern tokens representing a child concept in the concept hierarchies;

identifying at least one pattern match between sub-strings of the input string that are comprised of more than one of the matched input tokens and the pattern representing the child concept based on the token match and the set of constraints for the pattern;

scoring the at least one pattern match based on the corresponding token match to provide at least one match score; and determining which of the child concepts are present in the input string based on the corresponding match score, wherein a plurality of child concepts, contained in a plurality of concept hierarchies, is present in the input string, the presence of the child concepts in the input string identifying that at least one parent concept is referenced in the input string of text.

17. The method of claim 16, wherein the concept is represented by patterns that are synonyms describing the concept, and wherein any of the patterns can be used to identify the concept.

18. The method of claim 16, wherein the pattern tokens include a stem modifier modifying a word so that an input word in the input string matches the word when the input word contains a same stem.

19. The method of claim 16, further comprising:
applying a hash function to the pattern to obtain a first hash value for the pattern that is stored in a hash table;
applying the hash function to the input tokens to obtain a second hash value; and
finding a match between the first and second hash values in the hash table.

20. The method of claim 19, further comprising using a metaphone when applying the hash function.

21. The method of claim 16, wherein the pattern is a compound pattern composed of sub-patterns, each sub-pattern comprising input tokens, wherein the compound pattern selected from a group consisting of: set compound pattern, sequence compound pattern, alternative compound pattern, concatenation pattern, required pattern, optional pattern, more important pattern, and less important pattern.

22. The method of claim 21, wherein the compound pattern is matched when at least one of its sub-patterns is matched.

23. The method of claim 16, wherein the token match is identified when words forming the input tokens are spelled substantially similarly to words forming the pattern tokens.

24. The method of claim 16, wherein the pattern is comprised of basic patterns, selected from a group consisting of a character, a symbol, a number, a stemmed word, and an exact word.

25. The method of claim 24, further comprising calculating an importance value for each of the basic patterns, wherein the importance value must exceed a threshold value for the pattern to be scored, wherein scoring the pattern match further comprises:
assigning each of the basic patterns a weight; and
calculating the match score that comprises an overall score for the pattern based on the weight.

26. The method of claim 24, wherein scoring the pattern match further comprises:
assigning each of the basic patterns a weight; and
calculating the match score that comprises an overall score for the pattern based on the weight.

27. The method of claim 26, wherein assigning each of the basic patterns a weight further comprises assigning a lower weight to more frequently used of the basic patterns.

28. The method of claim 16, wherein scoring the pattern match further comprises calculating the match score to take into account the input tokens in the input string that are unmatched and that lie between the input tokens that are matched.

29. The method of claim 28, wherein a distance constraint is applied that limits number of the unmatched input tokens that can lie between the input tokens that are matched.

30. The method of claim 16, wherein determining which of the child concepts are present in the input string based on the score further comprises:
comparing the match score for the pattern match to a threshold score;
selecting a substantially plausible match, wherein the pattern match is considered substantially plausible when the match score exceeds the threshold score; and
using dynamic programming techniques to select the pattern match that is non-conflicting with other pattern matches in the input string.

31. The method of claim 16, wherein determining which of the child concepts are present in the input string further comprises identifying a sub-string of text in the input string as naming the concept present in the input string based on the token match.

32. A computer system for identifying a parent concept referenced in an input string of text by determining the presence of a child concept in the input string, the system comprising:
a computer-readable storage medium configured to store a plurality of concept hierarchies, each concept hierarchy comprising a plurality of concepts in a knowledge base, including parent concepts and child concepts, wherein each child concept inherits characteristics of a parent concept, wherein each concept is represented in the knowledge base by a pattern which comprises one or more pattern tokens, wherein at least some of the patterns representing concepts comprise multiple pattern tokens that are associated with each other by a set of constraints;
a tokenization module, stored on the computer-readable storage medium, configured to divide the input string into input tokens that represent sub-strings of text within the input string;
a token matching module, stored on the computer-readable storage medium, configured to
identify at least one token match between any of the input tokens and any of the pattern tokens representing a child concept in the concept hierarchies;
a pattern matching module, stored on the computer-readable storage medium, configured to identify at least one pattern match between sub-strings of the input string that are comprised of more than one of the matched input tokens and the pattern representing the child concept based on the token match and the set of constraints for the pattern;
a pattern scoring module, stored on the computer-readable storage medium, configured to score the at least one pattern match based on the corresponding token match to provide at least one match score; and
a pattern selection module, stored on the computer-readable storage medium, configured to determine which of the child concepts are present in the input string based on the corresponding match score, wherein a plurality of child concepts, contained in a plurality of concept hierarchies, is present in the input string, the presence of the child concepts in the input string identifying that at least one parent concept is referenced in the input string of text.

33. The system of claim 32, wherein the concept is represented by patterns that are synonyms describing the concept, and wherein any of the patterns can be used to identify the concept.

34. The system of claim 32, wherein the pattern tokens include an exact modifier modifying a word so that an input word in the input string matches the word when spelling of the input word exactly matches spelling of the word.

35. The system of claim 32, further comprising:
a hash module for applying a hash function to the pattern to obtain a first hash value for the pattern that is stored in a hash table and for applying the hash function to the input tokens to obtain a second hash value; and
a matching module for finding a match between the first and second hash values in the hash table.

36. The system of claim 32, wherein the pattern is a compound pattern composed of sub-patterns, each sub-pattern comprising input tokens, wherein the compound pattern selected from a group consisting of: set compound pattern, sequence compound pattern, alternative compound pattern, concatenation pattern, required pattern, optional pattern, more important pattern, and less important pattern.

37. The system of claim 32, wherein the system is configured to match the concept with a term in the input string where the term is spelled differently from the concept.

38. The system of claim 32, wherein the pattern is comprised of basic patterns and wherein the pattern scoring module is further configured to:
assign each of the basic patterns a weight, wherein the weight assigned is inversely related to frequency of the basic patterns; and
calculate the match score that comprises an overall score for the pattern based on the weight.

39. The system of claim 32, wherein the pattern is comprised of basic patterns and wherein the pattern selection module is further configured to retrieve from an importance index an importance value for each of the basic patterns to determine whether to score each of the basic patterns.

40. The system of claim 32, wherein the pattern scoring module is further configured to take into account the input tokens in the input string that are unmatched and that lie between the input tokens that are matched.

41. The system of claim 32, wherein the pattern determination module is further configured to:
compare the match score for the pattern match to a threshold score;
select a likely match, wherein the pattern match is considered likely when the match score exceeds the threshold score; and
selecting a non-conflicting pattern match.

42. The system of claim 32, wherein the pattern determination module is further configured to identify a sub-string of text in the input string as naming the concept present in the input string based on the token match.

43. The system of claim 32, wherein the pattern includes a constraint in which a term in the pattern must appear in the input string for the pattern match to be identified.

44. The system of claim 32, wherein the pattern includes a constraint in which a term in the pattern is optional in the input string for the pattern match to be identified.

45. The system of claim 32, wherein the pattern includes a constraint that allows a sequence of concatenated patterns to match adjacent input tokens in the input string.

46. A computer-implemented method of matching a parent concept to one or more sub-strings in an input string of text by determining the presence of a child concept in the input string, the method comprising:
storing a plurality of concept hierarchies, each concept hierarchy comprising a plurality of concepts in a knowledge base, including parent concepts and child concepts, where each child concept inherits characteristics of a parent concept, wherein each concept is represented in the knowledge base by a pattern formed of basic patterns, each of which comprises one or more pattern tokens, wherein at least some of the patterns representing concepts comprise multiple pattern tokens that are
dividing the input string into input tokens that represent sub-strings of text within the input string;
identifying at least one token match between any of the input tokens and any of the
pattern tokens representing a child concept in the concept hierarchies;
identifying at least one pattern match between sub-strings of the input string that are comprised of more than one of the matched input tokens and the pattern representing the child concept based on the token match and the set of constraints for the pattern;
scoring the at least one pattern match based on the corresponding token match to provide at least one match score by assigning each of the basic patterns a weight that together equals a total weight for the pattern; and
selecting the at least one pattern match with the total weight that is highest and where the at least one pattern match does not overlap any other pattern matches for the input string, the at least one pattern match indicating that the child concept is present in the input string, wherein a plurality of child concepts, contained in a plurality of concept hierarchies, is present in the input string, the presence of the child concepts in the input string identifying that at least one parent concept is referenced in the input string of text.

47. The method of claim 46, wherein the concept is represented by patterns that are synonyms describing the concept, and wherein any of the patterns can be used to identify the concept.

48. The method of claim 46, wherein the pattern matches a term in the concept that is misspelled.

49. The method of claim 46, wherein the basic patterns are selected from a group consisting of a character, a symbol, a number, a stemmed word, and an exact word.

50. The method of claim 46, wherein one or more of the basic patterns form sub-patterns of a compound pattern, the compound pattern selected from a group consisting of: set compound pattern, sequence compound pattern, alternative compound pattern, concatenation pattern, required pattern, optional pattern, more important pattern, and less important pattern.

* * * * *

UNITED STATES PATENT AND TRADEMARK OFFICE
CERTIFICATE OF CORRECTION

| | |
|---|---|
| PATENT NO. | : 7,599,930 B1 |
| APPLICATION NO. | : 11/253974 |
| DATED | : October 6, 2009 |
| INVENTOR(S) | : Derrick R. Burns and Earl F. Rennison |

It is certified that error appears in the above-identified patent and that said Letters Patent is hereby corrected as shown below:

In claim 46, Column 24, Line 19, add "associated with each other by a set of constraints;" after --multiple pattern tokens that are-- so it reads --multiple pattern tokens that are associated with each other by a set of constraints;--

Signed and Sealed this

Twenty-second Day of December, 2009

David J. Kappos
*Director of the United States Patent and Trademark Office*